Figure 1:
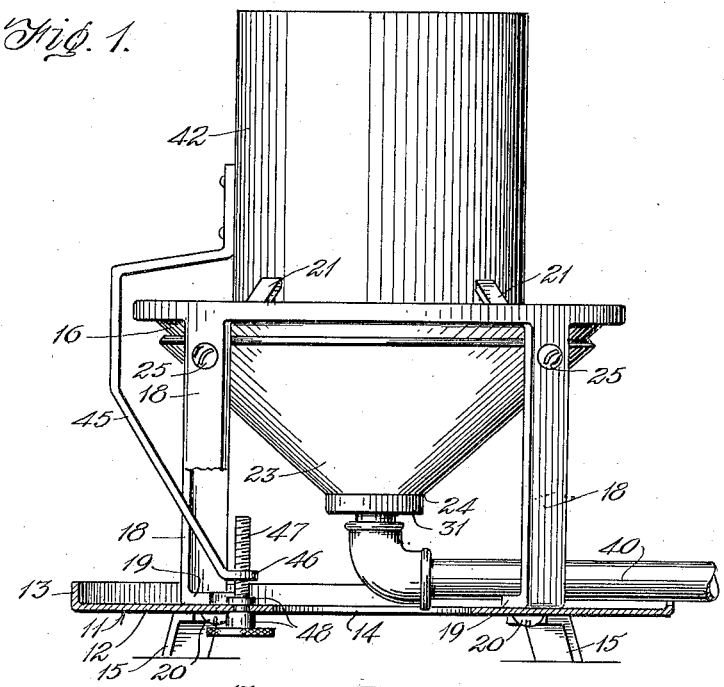

Oct. 4, 1938.  G. W. WHITEHURST  2,132,336
OIL OR LIQUID FUEL BURNER
Filed April 6, 1936  3 Sheets-Sheet 1

Inventor
George W. Whitehurst,

By Kimmel & Crowell,
Attorneys

Oct. 4, 1938.  G. W. WHITEHURST  2,132,336
OIL OR LIQUID FUEL BURNER
Filed April 6, 1936  3 Sheets-Sheet 2

Inventor
George W. Whitehurst,
By Kimmel & Crowell
Attorneys

Oct. 4, 1938.   G. W. WHITEHURST   2,132,336
OIL OR LIQUID FUEL BURNER
Filed April 6, 1936   3 Sheets—Sheet 3
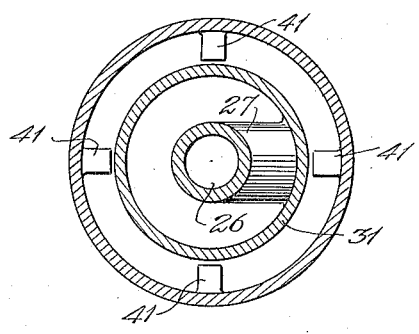
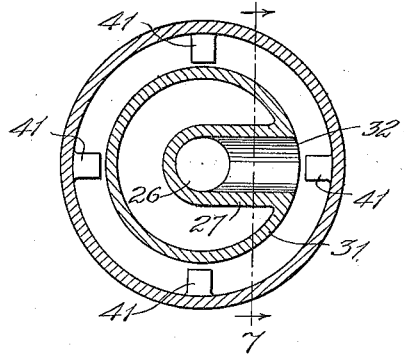
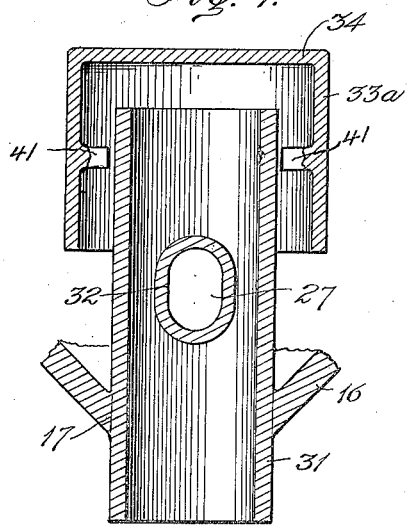
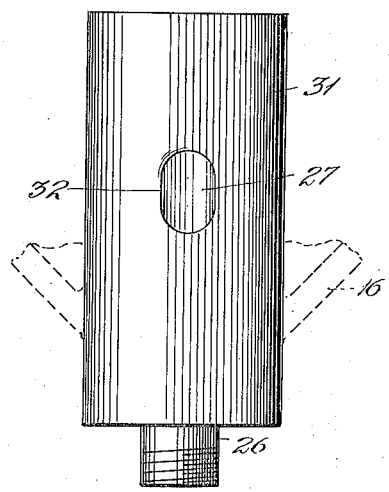
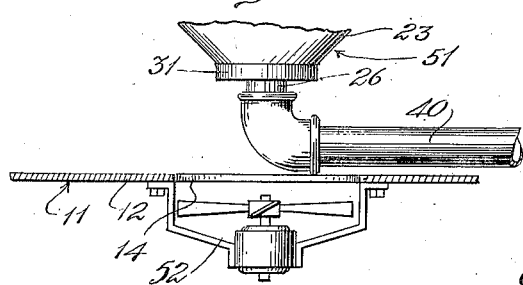
Inventor
George W. Whitehurst,
By Kimmel & Crowell,
Attorneys Patented Oct. 4, 1938

2,132,336

UNITED STATES PATENT OFFICE 2,132,336

OIL OR LIQUID FUEL BURNER

George W. Whitehurst, Portsmouth, Va.

Application April 6, 1936, Serial No. 73,030

14 Claims. (Cl. 158—91)

This invention relates to an oil or liquid fuel burner and has for its object to provide, in a manner as hereinafter set forth, a burner of the class referred to which is not dependent on a high chimney draft for its successful operation.

A further object of the invention is to provide, in a manner as hereinafter set forth, a burner of the class referred to of an extremely simple construction, easy to manufacture at a very low cost, and adapted to most any purpose where a vertical travel of heat is used, such as the heating element for steam, hot water or hot air, domestic heating plants and hot water heaters or boilers.

A further object of the invention is to provide, in a manner as hereinafter set forth, a burner of the class referred to so constructed and arranged as to enable a variation in heat or fire output, and so flexible that it may be controlled from an extremely low fire to its full capacity.

A further object of the invention is to provide, in a manner as hereinafter set forth, a burner of the class referred to including a combined fuel receiving and fuel vaporizing element and a burner tube capable of being adjusted relative to the said element for the purpose of controlling the intensity of the fire and with the tube, when moved upwardly from said element, providing for a large, slow moving air supply to enter the burner to cause a slow burning quiet fire and when the tube is lowered to a point in close proximity to said element causing a rapid flow of air to enter the burner and a large amount of air to be rotated around the base of the flame or fire resulting in an intense white, hot fire or flame.

A further object of the invention is to provide, in a manner as hereinafter set forth, a burner capable of being used with any type of liquid fuel and providing, when in action, a clean fire with no permanent carbon deposit and what carbon there may be in the fuel which cannot be vaporized will be deposited in a thin layer at the base of the combined fuel receiving and vaporizing element, and will accumulate until it has sufficient body for the heat to curl it up in what may be termed wick-like form, and as the wick grows in height, which is very slight, it begins to glow, burn away and be consumed as fast as it is formed.

A further object of the invention is to provide, in a manner as hereinafter set forth, an oil burner so constructed and arranged as to provide a practically cold fuel entering direct into the fire.

A further object of the invention is to provide, in a manner as hereinafter set forth, an oil burner so constructed and arranged that it provides for the introduction of all air at the very closest possible point to the base of the fire or flame and which is the best possible way to burn liquid fuel from a vaporizing standpoint and further provides combustion without smoke even with the lowest possible fire.

With the foregoing and other objects in view, the invention consists of the novel construction, combination and arrangement of parts as will be more specifically referred to and are as illustrated in the accompanying drawings wherein is shown an embodiment of the invention, but it is to be understood that changes, variations and modifications may be resorted to which fall within the scope of the invention as claimed.

Figure 2:
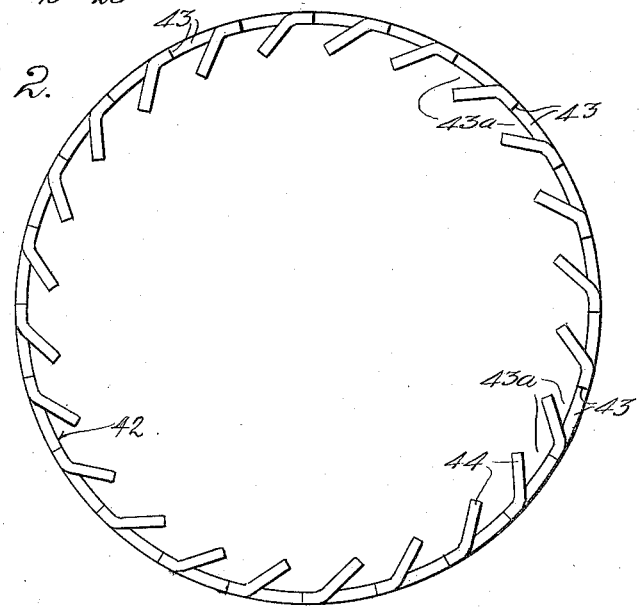
Figure 3:
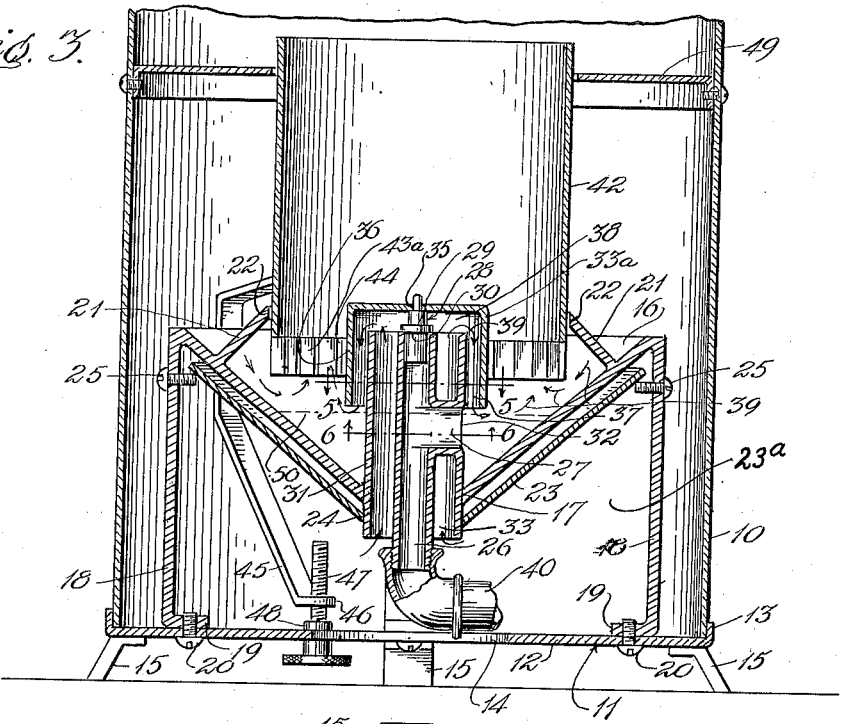
Figure 4:
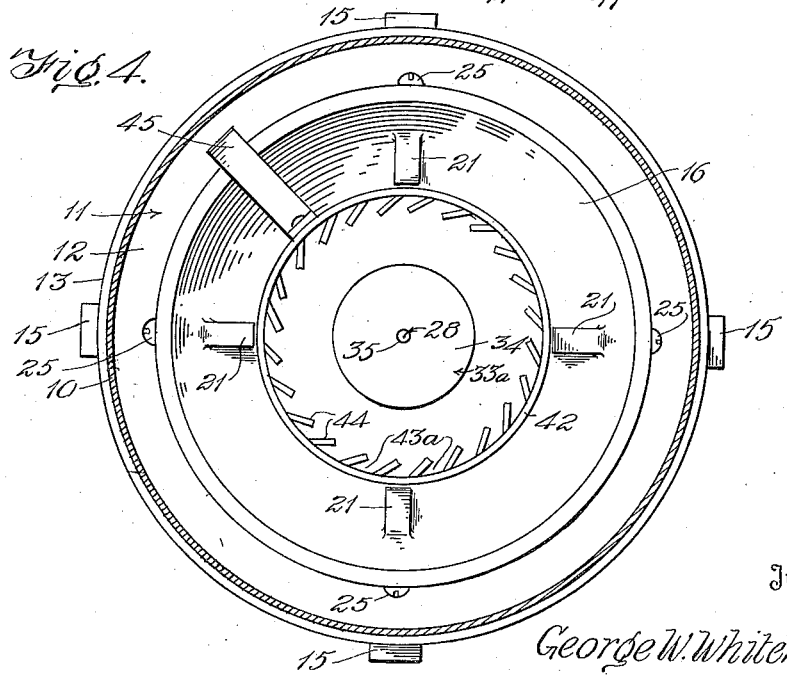

In the drawings:

Figure 1 is a side elevation, broken away, of the burner,

Figure 2 is a view looking towards the inner end of the burner tube and upon an enlarged scale, Figure 3 is a section on the vertical median of the burner and further illustrating the adaptation of the burner relative to a heater body, Figure 4 is a top plan view of the structure shown in Figure 3, Figure 5 is a section on line 5—5 Figure 3, Figure 6 is a section on line 6—6 Figure 3, Figure 7 is a section on line 7—7 Figure 6, Figure 8 is a side elevation of the central air tube which encompasses and is connected to the fuel intake pipe, Figure 9 is a fragmentary view in vertical section of the burner illustrating the latter as connected to a forced draft.

The burner, in accordance with this invention, is illustrated, by way of example, as being installed with respect to the shell-like body 10 of a heater. It is to be understood that the body 10 may be of any suitable contour and it is shown, by way of example, as being circular.

The burner, in accordance with this invention, includes a base 11 which may be of any suitable contour and, as shown by way of example, corresponds in contour to that of the body 10. The base 11 consists of a flat plate 12 provided at its edge with an endless, upstanding flange 13. The plate 12 has an axially arranged large opening 14. The plate 12 is supported upon spaced, angle-shaped legs 15 which have their upper portions suitably secured to the lower face of plate 12. The body 10 is seated on the plate 12 and has the lower portion of its outer periphery positioned against the inner face of the flange 13.

The body 10 and base 11 may be suitably connected together.

The burner includes a vertically disposed, hollow, funnel-shaped receptacle constituting a combined fuel receiving and vaporizing element 16. The latter, at its lower end, has an axially arranged opening 17 and also has integral with its lower face, at its upper end, a set of depending spaced supports 18 formed at their lower ends with inwardly extending foot pieces 19 seated on the upper face of the base 11 and spaced from the flange 13. Holdfast devices 20 are employed for detachably coupling the foot pieces 19 to the base 11. Formed integral with the upper face of the element 16, in proximity to its top edge, is a series of spaced inwardly extending upwardly inclined guide arms 21 having vertical upper edges 22. The purpose of the arms 21 will be hereinafter referred to. Arranged below and in spaced relation to the lower face of the element 16 is a vertically disposed funnel-shaped member 23 formed at its lower end and axially thereof with an opening 24 corresponding in diameter to the opening 17. The member 23 constitutes a shield for a purpose to be referred to. The member 23 coacts with the element 16 to provide therebetween as dead air space 22a. The supports 18, in proximity to their upper ends, are provided with inwardly extending and adjustable studs 25 upon which seats the member 23 at points adjacent its top edge.

The burner includes an axially arranged, vertically disposed fuel intake pipe 26 formed intermediate its ends with a laterally extending tubular branch 27 which is open at its inner and outer ends. The pipe 26 is open at its upper and lower ends and has its upper end flush with the top edge of element 16. The upper end of the pipe 26 has seated therein a combined closure, support and spacing member 28 formed with upper and lower peripheral shoulders 29, 30 respectively. The shoulder 30 seats upon the top edge of the pipe 26. Encompassing in spaced relation the pipe 26 is a vertically disposed air intake sleeve 31 disposed in concentric spaced relation to the pipe 26 and providing a shield for the latter. The sleeve 31 is flush with the upper end of pipe 26. The branch 27 of pipe 26 is integral with the inner face of the sleeve 31. The body of sleeve 31 has an opening 32 which registers with the open outer end of the branch 27. The pipe 26 is carried by the sleeve 31 and forms, in connection therewith, an air passage 33 which surrounds pipe 26. The intake and outlet for the passage 33 is at the lower and upper ends respectively of said passage. The lower end of sleeve 31 is spaced above the lower end of the pipe 26. Mounted on the shoulder 29 and through which extends the upper portion of member 28, is a cap 33a of greater diameter than the outer diameter of the sleeve 31. The top 34 of cap 33a has an opening 35 through which extends member 28. The top 34 seats on the shoulder 29. The body 36 of cap 33a encompasses in spaced relation the upper portion of the sleeve 31 and forms, in connection with the latter, an air passage 37. The top 34 of cap 33a is spaced from the upper ends of the pipe 26 and sleeve 31 and forms an air space 38 into which the upper end of passage 33 opens. The upper end of passage 37 opens into the space 38. The lower end of passage 37 opens into element 16. The cap 33a constitutes an air deflector and also a shield for the upper portion of the sleeve 31. The member 28 and cap 33a provides an upstanding combined shield, air deflector and closure structure. The manner in which the air travels through the passage 33, 37 and space 38 is indicated by the arrows 39.

The sleeve 31 extends through the openings 17 and 33 and depends below the member 23. The element 16 is welded to the sleeve 31. The member 23 abuts the outer periphery of the sleeve 31 and may or may not be welded thereto. Preferably it is not.

Secured to the lower end of the pipe 26 is a fuel feed line 40 which leads to an oil leveling valve supply not shown. The body 36 of the cap 33a is provided with spacing lugs 41 which abut the sleeve 31.

The burner includes a vertically adjustable burner tube 42 of the desired outer diameter and height. The tube 42 extends into element 16 and is disposed in concentric relation with the cap 33a. The inner diameter of the tube 42 is materially greater than the outer diameter of the body part 36 of cap 33a. The tube 42 is arranged between the arms 21 and has its movement guided by said arms. The bottom of the tube 42 is formed throughout with spaced angle-shaped slits 43 and the material freed by the slits is bent inwardly to form air intakes 43a and tangentially disposed vanes 44 which function to rotate the air that enters the bottom of the tube and to constitute air deflectors. Fixedly secured to the outer periphery of the tube 42 is a depending lifting and lowering arm 45 therefor. The latter is of angle contour and is formed at its lower end with an inwardly extending apertured part 46 which threadedly engages with an adjusting screw 47 functioning to elevate or lower arm 45 and on the elevating or lowering of said arm the tube 42 is carried therewith. The screw 47 is provided with means, as indicated at 48, for rotatably coupling it to the base 11. The shell 10 is provided with a header 49 for the tube 42.

The member 23 constitutes a shield to prevent the upgoing cold air from cooling element 16 and also acts as a deflector for such air. The cap 33a provides what may be termed an air conducting means. Preferably the fuel level in element 16 will be as indicated at 50, but it is to be understood that the level may be at any point desired and, further, the feed may be so controlled as to vary the area of the fuel level.

The construction of the burner provides means whereby the intensity of the fire may be adjusted and in this connection it will be stated that by raising the burner tube upwardly with respect to element 16 a large, slow moving air supply is allowed to enter resulting in a slow burning, quiet fire, but by lowering the burner tube down close to the element 16 it will cause a rapid flow of air and forces a large amount of air at the base of the flame or fire resulting in an intense, white, hot fire or flame. With respect to the foregoing when the tube 42 is raised the localized rate of flow of air through sleeve 31 will be reduced, but when the tube 42 is lowered the localized rate of flow of air through sleeve 31 will be increased thereby causing a very rapid combustion. When the tube 42 is lowered, the total flow of air is reduced. The larger the sleeve 31, the closer tube 42 may be adjusted to element 16. The adjustment of tube 42 to effect the rate of flow will provide for the temperature desired in the element 16. The tube 42 may be raised until the rate of combustion is so slow that soot will form over the entire upper surface of element 16 and then by lowering the tube 42 to an extent to provide a more rapid rate of combustion thereby raising the temperature of element 16 resulting in the consuming of the soot. The construction of the burner provides for power burner ability on natural draft.

The burner may be used with any liquid fuel and will burn the fuel with a clean fire and no carbon deposit.

The burner is so constructed that practically cold fuel enters direct into element 16 to prevent fouling.

The air supplied through the air conducting cap, together with the air entering the burning tube, introduces all the air at the very closest possible point to the base of the fire or flame or level of the fuel, which is the best possible way to burn liquid fuel from a vaporizing standpoint and which enables the lowest fire to burn with no smoke.

The fire or flame is always within the burner tube 42. In operation there is no fuel level or body of fuel in element 16. The fuel when supplied is immediately vaporized, and if too much fuel is admitted for a given setting of the tube 42, then the vaporizing element cools down and a fuel level is established and as the fuel level rises it reduces the supply of air to under the cap 33ª and tube 42 whereby the fire is immediately extinguished. The fuel level 50 will only be established if the fire fails to consume the fuel as fast as it enters element 16 and when the fuel leveling device checks the fuel at the correct level. The heat generated in the burner tube is radiated downwardly and keeps the surfaces of element 16 and the upper portion of sleeve 31 hot enough to vaporize the fuel as fast as it enters, whereby element 16 not only functions as a fuel receiver but also as a fuel vaporizer which is a departure from the well known type fire pot and perforated cylinder type of liquid fuel burners. The inrush of air from under the burner tube 42 from outside and from under cap 33ª from the center of the burner makes an intense heat low down or close to the surface of element 16 and sleeve 31 which makes it possible for the vaporizing of a large quantity of fuel in a small space, whereas a fire pot or perforated cylinder would have to be from ten to twelve inches in diameter. The intense heat generated provides for the consumption of the major portion of any carbon deposit. The fuel is combusted substantially when supplied to element 16 whereby the latter is heated. The coolest point of element 16 is at its junction with the sleeve 31 and increases in temperature from such point. The space 23ª in connection with the shield 23 prevents the air under the lower face of element 16 from cooling the latter.

What I claim is:

1. In a liquid fuel burner, a vertical combined fuel receiving and fuel vaporizing element of funnel-shaped contour, a fuel intake pipe extending upwardly in and discharging intermediate its ends into said element, a vertical air intake sleeve encompassing said pipe and intaking air at its lower end, a closure for the upper end of the pipe, a downwardly opening air conducting means of cap-like form supported by said closure, spaced above the upper ends of said sleeve and pipe and encompassing in spaced relation the upper portion of said sleeve, said pipe and sleeve extending through and depending from the bottom of the element, and a burner tube suspended over said element and disposed in concentric relation to said air conducting means.

2. In a liquid fuel burner, a vertical combined fuel receiving and fuel vaporizing element of funnel-shaped contour, a fuel intake pipe extending upwardly in and discharging intermediate its ends into said element, a vertical air intake sleeve encompassing said pipe and intaking air at its lower end, a closure for the upper end of the pipe, a downwardly opening air conducting means of cap-like form supported by said closure, spaced above the upper ends of said sleeve and pipe and encompassing in spaced relation the upper portion of said sleeve, said pipe and sleeve extending through and depending from the bottom of the element, a burner tube suspended over said element and disposed in concentric relation to said air conducting means, and a shield corresponding in contour to and arranged below and in spaced relation to said element.

3. In a liquid fuel burner, a vertical combined fuel receiving and fuel vaporizing element of funnel-shaped contour, a fuel intake pipe extending upwardly in and discharging intermediate its ends into said element, a vertical air intake sleeve encompassing said pipe and intaking air at its lower end, a closure for the upper end of the pipe, a downwardly opening air conducting means of cap-like form supported by said closure, spaced above the upper ends of said sleeve and pipe and encompassing in spaced relation the upper portion of said sleeve, said pipe and sleeve extending through and depending from the bottom of said element, a supporting structure for said element, a burner tube suspended over said element and disposed in concentric relation to said air conducting means, and means carried by said structure for vertically adjusting said tube relative to said element.

4. In a liquid fuel burner, a vertical combined fuel receiving and fuel vaporizing element of funnel-shaped contour, a fuel intake pipe extending upwardly in and discharging intermediate its ends into said element, a vertical air intake sleeve encompassing said pipe and intaking air at its lower end, a closure for the upper end of the pipe, a downwardly opening air conducting means of cap-like form supported by said closure, spaced above the upper ends of said sleeve and pipe and encompassing in spaced relation the upper portion of said sleeve, said pipe and sleeve extending through and depending from the bottom of said element, a shield corresponding in contour to and arranged below and in spaced relation to said element, a supporting structure common to said shield and element, a burner tube suspended over said element and disposed in concentric relation to said air conducting means, and means carried by said structure for vertically adjusting said tube relative to said element.

5. The invention as set forth in claim 1 having the lower end of the burner tube formed with air intakes and inwardly extending vanes leading from said air intakes.

6. The invention as set forth in claim 2 having the lower end of the burner tube formed with air intakes and inwardly extending vanes leading from said air intakes.

7. In a liquid fuel burner, an upstanding combined fuel receiving and fuel vaporizing element, a vertically disposed fuel intake pipe extending upwardly in and discharging intermediate its ends into said element, said pipe having a closed upper end, a vertical air intake sleeve extending in said element, encompassing in spaced relation said pipe, open at each end, intaking air at its lower end and anchored to said pipe, an air conducting means of cap-like form for directing air into said element, spaced above the upper ends of said sleeve and pipe and encompassing in spaced relation the upper portion of said sleeve, and a burner tube arranged over said element and in concentric spaced relation to said air conducting means.

8. In a liquid fuel burner, an upstanding combined fuel receiving and fuel vaporizing element, a vertically disposed fuel intake pipe extending upwardly in and discharging intermediate its ends into said element, said pipe having a closed upper end, a vertical air intake sleeve extending in said element, encompassing in spaced relation said pipe, open at each end, intaking air at its lower end and anchored to said pipe and element, an air conducting means of cap-like form for directing air into said element, spaced above the upper ends of said sleeve and pipe and encompassing in spaced relation the upper portion of said sleeve, a burner tube arranged over said element and in concentric spaced relation to said air conducting means, and a combined shield and air deflector arranged below and in proximity to the lower face of said element.

9. In a liquid fuel burner, an upstanding combined fuel receiving and fuel vaporizing element, a vertically disposed fuel intake pipe extending upwardly in and discharging intermediate its ends into said element, said pipe having a closed upper end, a vertical air intake sleeve extending in said element, encompassing in spaced relation said pipe, open at each end, intaking air at its lower end and anchored to said pipe and element, an air conducting means of cap-like form for directing air into said element, spaced above the upper ends of said sleeve and pipe and encompassing in spaced relation the upper portion of said sleeve, a burner tube arranged over said element and in concentric spaced relation to said air conducting means, means for vertically adjusting said tube relative to said element, a combined shield and air deflector arranged below and in proximity to the lower face of said element, said element and combined shield and deflector being so related to provide a space located to form therebetween for air not to cool the lower surface of said element and a supporting structure common to said element, said combined shield and deflector and the said adjusting means for said tube.

10. In a liquid fuel burner, an upstanding liquid fuel conducting pipe having its lower end constituting an intake and provided intermediate its ends with a laterally extending branch constituting an outlet, an upstanding sleeve encompassing in spaced relation the said pipe and forming in connection with the latter an air conducting passage, said sleeve being formed intermediate its ends with an opening, the wall of said opening encompassing and merging into the outer end of the outer periphery of said branch, a vertically disposed combined fuel receiving and vaporizing element substantially of funnel-shaped contour encompassing the major portion of the length of said sleeve, said sleeve extending through the bottom of said element axially of the latter, and said element being connected axially of its lower end to the said sleeve in proximity to the lower end of the sleeve and below and in proximity to the outer end of said branch.

11. In a liquid fuel burner, an upstanding liquid fuel conducting pipe having its lower end constituting an intake and provided intermediate its ends with a laterally extending branch constituting an outlet, an upstanding sleeve encompassing in spaced relation the said pipe and forming in connection with the latter an air conducting passage, said sleeve being formed intermediate its ends with an opening, the wall of said opening encompassing and merging into the outer end of the outer periphery of said branch, a vertically disposed combined fuel receiving and vaporizing element substantially of funnel-shaped contour encompassing the major portion of the length of said sleeve, said sleeve extending through the bottom of said element axially of the latter, said element being connected axially of its lower end to the said sleeve in proximity to the lower end of the sleeve and below and in proximity to the outer end of said branch, and vertically disposed supporting means for said element, said supporting means being integral at its upper end with the top of said element.

12. In a liquid fuel burner, an upstanding liquid fuel conducting pipe having its lower end constituting an intake and provided intermediate its ends with a laterally extending branch constituting an outlet, an upstanding sleeve encompassing in spaced relation the said pipe and forming in connection with the latter an air conducting passage, said sleeve being formed intermediate its ends with an opening, the wall of said opening encompassing and merging into the outer end of the outer periphery of said branch, a vertically disposed combined fuel receiving and vaporizing element substantially of funnel-shaped contour encompassing the major portion of the length of said sleeve, said sleeve extending through the bottom of said element axially of the latter, said element being connected axially of its lower end to the said sleeve in proximity to the lower end of the sleeve and below and in proximity to the outer end of said branch, a closure element for the upper end of said pipe, a cap element arranged over the upper end of said pipe and sleeve and encompassing the upper portion of the sleeve, said closure element being provided with means for supporting said cap element in spaced relation to the upper end of said pipe and sleeve and in spaced relation to the upper portion of said sleeve, and said cap element being provided with means for maintaining it in spaced relation with respect to the upper portion of said sleeve.

13. In a liquid fuel burner, an upstanding liquid fuel conducting pipe having its lower end constituting an intake and provided intermediate its ends with a laterally extending branch constituting an outlet, an upstanding sleeve encompassing in spaced relation the said pipe and forming in connection with the latter an air conducting passage, said sleeve being formed intermediate its ends with an opening, the wall of said opening encompassing and merging into the outer end of the outer periphery of said branch, a vertically disposed combined fuel receiving and vaporizing element substantially of funnel-shaped contour encompassing the major portion of the length of said sleeve, said sleeve extending through the bottom of said element axially of the latter, said element being connected axially of its lower end to the said sleeve in proximity to the lower end of the sleeve and below and in proximity to the outer end of said branch, a structure for closing the upper end of the pipe and for downwardly directing the air discharged from the upper end of said sleeve, and a vertically adjustable burner tube arranged over said element and in concentric spaced relation to said structure.

14. In a liquid fuel burner, an upstanding liquid fuel conducting pipe closed at its upper end and having an intake at its lower end, said pipe being formed intermediate its ends with a laterally disposed discharge branch, an upstanding sleeve constituting a shield for and arranged in concentric spaced relation with respect to said pipe, said sleeve being open at each of its ends, said shield being integral with and having its body formed with an opening registering with the outlet end of said branch, said sleeve in connection with said pipe providing a passage for conducting air upwardly, the lower and upper ends of said shield providing respectively the intake and outlet of said passage, a suspended inverted cup-shaped member having its upper end arranged in spaced relation to the upper ends of said sleeve and pipe and forming an air receiving space, said member having its body disposed in concentric spaced relation with respect to and providing a shield for the upper portion of said sleeve, the body of said member and the upper portion of said shield coacting to provide to downwardly discharge air from said space.

GEORGE W. WHITEHURST.